US012579747B2

(12) United States Patent　　　　　(10) Patent No.:　US 12,579,747 B2
Chaurasia et al.　　　　　　　　　　(45) Date of Patent:　　Mar. 17, 2026

(54) SYSTEMS, METHODS, AND MEDIA FOR GENERATING VISUALIZATION OF PHYSICAL ENVIRONMENT IN ARTIFICIAL REALITY

(71) Applicant: Meta Platforms Technologies, LLC, Menlo Park, CA (US)

(72) Inventors: Gaurav Chaurasia, Meilen (CH); Jan Oberländer, Binningen (CH); Ricardo da Silveira Cabral, Zurich (CH); Paul Timothy Furgale, Thalwil (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 92 days.

(21) Appl. No.: 18/483,813

(22) Filed: Oct. 10, 2023

(65) Prior Publication Data

US 2024/0119672 A1　　Apr. 11, 2024

Related U.S. Application Data

(60) Provisional application No. 63/378,949, filed on Oct. 10, 2022.

(51) Int. Cl.
G06T 17/20　　　(2006.01)
G06T 3/18　　　(2024.01)
　　　　　(Continued)

(52) U.S. Cl.
CPC ............... G06T 17/20 (2013.01); G06T 3/18 (2024.01); G06T 7/90 (2017.01); G06V 10/56 (2022.01);
　　　　　(Continued)

(58) Field of Classification Search
CPC .. G06T 17/20; G06T 3/18; G06T 7/90; G06T 2207/10024; G06T 7/593; G06V 10/56;
　　　　　(Continued)

(56) References Cited

U.S. PATENT DOCUMENTS 8,724,894 B1　5/2014　Jensen et al.
9,002,099 B2　4/2015　Litvak et al.
　　　　(Continued)

FOREIGN PATENT DOCUMENTS

CN　　107533230 A　1/2018
CN　　107850936 A　3/2018
　　　　(Continued)

OTHER PUBLICATIONS

EPO—International Search Report and Written Opinion for International Application No. PCT/US2020/012829, mailed Jun. 26, 2020, 17 Pages.

(Continued)

*Primary Examiner* — Said Broome
(74) *Attorney, Agent, or Firm* — Greenberg Traurig, LLP

(57) ABSTRACT

In one embodiment, a method by a computing system comprising a color camera and two monochrome cameras respectively associated with two eyes of a user includes computing a point cloud corresponding to a visible environment based at least on two stereoscopic grayscale images respectively captured by the two monochrome cameras, generating a mesh corresponding to the visible environment based on the computed point cloud, and generating two stereoscopic colorized images to be respectively displayed to the two eyes of the user, where each of the two stereoscopic colorized images is generated using (1) the mesh, (2) luminance information from one of the two stereoscopic grayscale images that is associated with the eye to which the stereoscopic colorized image is to be displayed, and (3) color information from a color input image captured by the color camera.

20 Claims, 7 Drawing Sheets

(51) Int. Cl.

| | |
|---|---|
| *G06T 7/90* | (2017.01) |
| *G06V 10/56* | (2022.01) |
| *G06V 10/60* | (2022.01) |
| *H04N 13/257* | (2018.01) |
| *H04N 13/275* | (2018.01) |

(52) U.S. Cl.
CPC ........... *G06V 10/60* (2022.01); *H04N 13/257* (2018.05); *H04N 13/275* (2018.05); *G06T 2207/10024* (2013.01)

(58) Field of Classification Search
CPC ........ G06V 10/60; G06V 20/20; G06V 40/18; H04N 13/257; H04N 13/275; H04N 13/239
See application file for complete search history.

(56) References Cited

U.S. PATENT DOCUMENTS

| | | | |
|---|---|---|---|
| 9,344,707 | B2 | 5/2016 | Lee et al. |
| 9,392,264 | B1 | 7/2016 | Chang |
| 9,836,839 | B2 | 12/2017 | Champlin et al. |
| 10,001,645 | B2 | 6/2018 | Norden |
| 10,124,257 | B2 | 11/2018 | Stafford |
| 10,261,594 | B2 | 4/2019 | Marcolina et al. |
| 10,776,997 | B2 | 9/2020 | Schmalstieg et al. |
| 10,803,663 | B2 | 10/2020 | Wang et al. |
| 10,817,749 | B2 | 10/2020 | Biswas et al. |
| 10,987,579 | B1 | 4/2021 | Borovikov et al. |
| 11,037,359 | B1 | 6/2021 | Bleyer et al. |
| 11,107,280 | B1 | 8/2021 | Clohset et al. |
| 11,200,745 | B2 | 12/2021 | Johnson et al. |
| 11,392,211 | B2 | 7/2022 | Holz |
| 11,461,962 | B1 | 10/2022 | Parra Pozo et al. |
| 11,481,960 | B2 | 10/2022 | Marra et al. |
| 11,501,471 | B2 | 11/2022 | Imao |
| 12,033,270 | B2 | 7/2024 | Marra et al. |
| 2003/0034974 | A1 | 2/2003 | Welch et al. |
| 2008/0084472 | A1 | 4/2008 | Trudeau et al. |
| 2008/0088529 | A1 | 4/2008 | Tang |
| 2009/0259967 | A1 | 10/2009 | Davidson et al. |
| 2010/0283781 | A1* | 11/2010 | Kriveshko .............. G06T 17/00 715/849 |
| 2011/0298827 | A1 | 12/2011 | Perez |
| 2011/0302293 | A1 | 12/2011 | Buban |
| 2012/0092328 | A1 | 4/2012 | Flaks et al. |
| 2012/0264510 | A1 | 10/2012 | Wigdor et al. |
| 2012/0309516 | A1 | 12/2012 | Langridge et al. |
| 2013/0005467 | A1 | 1/2013 | Kim |
| 2013/0083063 | A1 | 4/2013 | Geisner et al. |
| 2013/0093788 | A1 | 4/2013 | Liu et al. |
| 2013/0201188 | A1 | 8/2013 | Choi et al. |
| 2013/0336550 | A1 | 12/2013 | Kapur et al. |
| 2014/0035901 | A1 | 2/2014 | Chen et al. |
| 2014/0147014 | A1 | 5/2014 | Mallet et al. |
| 2014/0204002 | A1 | 7/2014 | Bennet et al. |
| 2014/0306951 | A1 | 10/2014 | Toiyama |
| 2014/0336461 | A1* | 11/2014 | Reiter ................ A61B 1/00193 600/111 |
| 2014/0341464 | A1* | 11/2014 | Fan ......................... G06T 7/194 382/154 |
| 2015/0235610 | A1 | 8/2015 | Miller et al. |
| 2015/0249839 | A1 | 9/2015 | Shimizu et al. |
| 2016/0040892 | A1* | 2/2016 | Wiseman ................ F24C 7/081 219/412 |
| 2016/0093108 | A1 | 3/2016 | Mao et al. |
| 2016/0162039 | A1 | 6/2016 | Eilat et al. |
| 2016/0320863 | A1 | 11/2016 | Shimoda |
| 2017/0052507 | A1 | 2/2017 | Poulos et al. |
| 2017/0052595 | A1 | 2/2017 | Poulos et al. |
| 2017/0140552 | A1 | 5/2017 | Woo et al. |
| 2017/0186165 | A1 | 6/2017 | Taylor et al. |
| 2017/0213320 | A1 | 7/2017 | Yucer et al. |
| 2017/0243324 | A1 | 8/2017 | Mierle et al. |
| 2017/0287215 | A1 | 10/2017 | Lalonde et al. |
| 2017/0294030 | A1 | 10/2017 | Coglitore |
| 2017/0309071 | A1 | 10/2017 | Benko et al. |
| 2017/0365100 | A1 | 12/2017 | Walton |
| 2017/0372510 | A1 | 12/2017 | Ye et al. |
| 2018/0067316 | A1 | 3/2018 | Lee et al. |
| 2018/0068488 | A1 | 3/2018 | Hart et al. |
| 2018/0088323 | A1 | 3/2018 | Bao et al. |
| 2018/0173404 | A1 | 6/2018 | Smith |
| 2018/0176483 | A1 | 6/2018 | Knorr et al. |
| 2018/0211398 | A1 | 7/2018 | Schmidt |
| 2018/0232056 | A1 | 8/2018 | Nigam et al. |
| 2018/0286053 | A1 | 10/2018 | Labbe et al. |
| 2018/0288354 | A1 | 10/2018 | Anderson et al. |
| 2018/0299922 | A1 | 10/2018 | Park |
| 2018/0315329 | A1 | 11/2018 | D'Amato et al. |
| 2018/0364801 | A1 | 12/2018 | Kim et al. |
| 2019/0087011 | A1 | 3/2019 | Kim et al. |
| 2019/0096119 | A1 | 3/2019 | Petkov et al. |
| 2019/0101758 | A1 | 4/2019 | Zhu et al. |
| 2019/0197765 | A1 | 6/2019 | Molyneaux et al. |
| 2019/0213789 | A1 | 7/2019 | Uyyala et al. |
| 2019/0220002 | A1 | 7/2019 | Huang et al. |
| 2019/0243448 | A1 | 8/2019 | Miller et al. |
| 2019/0325661 | A1 | 10/2019 | Baumbach et al. |
| 2019/0349648 | A1 | 11/2019 | Watanabe et al. |
| 2019/0362505 | A1 | 11/2019 | Kobayashi |
| 2019/0385372 | A1 | 12/2019 | Cartwright et al. |
| 2019/0391724 | A1 | 12/2019 | Holz et al. |
| 2020/0020166 | A1 | 1/2020 | Menard et al. |
| 2020/0026922 | A1 | 1/2020 | Pekelny et al. |
| 2020/0143584 | A1 | 5/2020 | Noris et al. |
| 2020/0225761 | A1 | 7/2020 | Sinha et al. |
| 2020/0238909 | A1 | 7/2020 | Yamamoto et al. |
| 2020/0280678 | A1 | 9/2020 | Hariyani et al. |
| 2020/0296354 | A1 | 9/2020 | Bickerstaff et al. |
| 2020/0311397 | A1 | 10/2020 | Sawhney et al. |
| 2020/0334877 | A1 | 10/2020 | Pokorny et al. |
| 2020/0334908 | A1 | 10/2020 | Wilson et al. |
| 2020/0342671 | A1 | 10/2020 | Ishihara |
| 2020/0357108 | A1 | 11/2020 | Zhou et al. |
| 2020/0401804 | A1 | 12/2020 | Grundhoefer et al. |
| 2021/0042950 | A1 | 2/2021 | Wantland et al. |
| 2021/0142497 | A1 | 5/2021 | Pugh et al. |
| 2021/0392316 | A1 | 12/2021 | Bleyer et al. |
| 2022/0121292 | A1 | 4/2022 | Lin |
| 2022/0206298 | A1 | 6/2022 | Goodman |
| 2022/0253144 | A1 | 8/2022 | Hu et al. |
| 2022/0262065 | A1 | 8/2022 | Godbole |

FOREIGN PATENT DOCUMENTS

| | | | | |
|---|---|---|---|---|
| CN | 110383343 | * | 10/2019 | .......... G06T 19/006 |
| EP | 2660643 | A2 | 11/2013 | |
| EP | 3163407 | A1 | 5/2017 | |
| GB | 2376397 | A | 12/2002 | |
| JP | 2009123018 | A | 6/2009 | |
| JP | 2009140296 | A | 6/2009 | |
| JP | 2013050895 | A | 3/2013 | |
| JP | 2014026590 | A | 2/2014 | |
| JP | 2015118332 | A | 6/2015 | |
| JP | 2018109835 | A | 7/2018 | |
| JP | 2019516180 | A | 6/2019 | |
| JP | 2019527881 | A | 10/2019 | |
| WO | 2012135554 | A1 | 10/2012 | |
| WO | 2015111283 | A1 | 7/2015 | |
| WO | 2016014873 | A1 | 1/2016 | |
| WO | 2017079657 | A1 | 5/2017 | |
| WO | 2019031015 | A1 | 2/2019 | |
| WO | 2022197825 | A1 | 9/2022 | |

OTHER PUBLICATIONS

Mueller; et al., "Real-Time Hand Tracking under Occlusion from an Egocentric RGB-D Sensor," IEEE International Conference on Computer Vision, Oct. 2017, 10 pages.

(56) References Cited

OTHER PUBLICATIONS

Nanni; et al. "Combination of Depth and Texture Descriptors for Gesture Recognition," Advances in Machine Learning Research, Jun. 2014, 35 pages.

JIPO—Office Action mailed Aug. 13, 2024 for Japanese Patent Application No. 2022-523612, filed on Dec. 25, 2020, 5 pages.

JIPO—Office Action mailed Aug. 13, 2024 for Japanese Patent Application No. 2022-534366, filed on Jan. 8, 2021, 6 pages.

CNIPA—Office Action mailed Jun. 27, 2024 for Chinese Application No. 202080008174.6, filed Jan. 3, 2020, 6 pages.

Reinert; et al., "Proxy-guided Image-based Rendering for Mobile Devices," Pacific Graphics, Oct. 27, 2016, vol. 35, No. 7, pp. 353-362.

Wang; et al., "Superpixel-Based Hand Gesture Recognition with Kinect Depth Camera," IEEE Transactions on Multimedia, Nov. 24, 2014, vol. 17, No. 1, pp. 29-39.

CNIPA—Office Action mailed Jan. 14, 2025 for Chinese Application No. 202080083121.0, filed Dec. 25, 2020, 9 pages.

CNIPA—Office Action mailed Jan. 16, 2025 for Chinese Application No. 202080086666.7, filed Dec. 24, 2020, 8 pages.

EPO—Office Action mailed Jan. 30, 2025 for European Patent Application No. 21851763.9, filed on Dec. 30, 2021, 11 pages.

JIPO—Office Action mailed Sep. 10, 2024 for Japanese Patent Application No. 2022-524107, filed on Dec. 24, 2020, 10 pages.

Ballan; et al., "Unstructured Video-Based Rendering: Interactive Exploration of Casually Captured Videos," ACM Transactions on Graphics (Proc. SIGGRAPH), Jul. 2010, vol. 29 (4), Article 87, 10 pages.

Chaurasia; et al., Silhouette-Aware Warping for Image-Based Rendering, Computer Graphic Forum (Proc. EGSR), Jul. 2011, vol. 30 (4), 11 Pages.

Chaurasia; et al.,"Depth Synthesis and Local Warps for Plausible Image-based Navigation," ACM Transactions on Graphics, Jun. 2013, vol. 32 (3), Article 30,12 pages.

Chen; et al., "View Interpolation for Image Synthesis," In ACM SIGGRAPH Conference Proceedings, Sep. 1, 1993, pp. 279-288.

Chen; "QuickTime VR—An Image-Based Approach to Virtual Environment Navigation," Proceedings of the 22nd annual conference on Computer graphics and interactive techniques, SIGGRAPH, Sep. 15, 1995, pp. 29-38.

Clarke A., et al., "A System for a Hand Gesture-Manipulated Virtual Reality Environment," Sep. 26-28, 2016, pp. 1-10, XP058299882.

Fanello; et al., "Low Compute and Fully Parallel Computer Vision with HashMatch," In the IEEE International Conference on Computer Vision (ICCV), Oct. 2017, 11 pages.

Gu; et al., "Application of Motion Vector in Live 3D Object Reconstruction," Patterns 2011: The Third International Conferences on Pervasive Patterns and Applications, Sep. 25, 2011, pp. 41-46.

Hausweisner S., et al., "Coherent Image-Based Rendering of Real-World Objects," Proceedings of the Symposium on Interactive 3D Graphics and games, Association for computing machinery USA,13D, Feb. 18-20, 2011, pp. 183-190, XP055677618.

Hedman; et al., "Casual 3D Photography," ACM Transactions on Graphics, Nov. 2017, vol. 36 (6), Article 234, pp. 1-15.

Hedman; et al., "Instant 3D Photography," ACM Transactions on Graphics, Aug. 2018, vol. 37 (4), Article 101, pp. 1-12.

Hirschmuller; et al., "Memory Efficient Semi-Global Matching. ISPRS Annals of the Photogrammetry," Remote Sensing and Spatial Information Sciences, XXII ISPRS Congress, Melbourne, Australia, Aug. 25, 2012-Sep. 12, 2012, vol. 1-3, pp. 371-376.

Hirschmuller; et al., "Stereo Processing by Semiglobal Matching and Mutual Information," IEEE Transactions on Pattern Analysis and Machine Intelligence, Feb. 2008, vol. 30 (2), pp. 328-341.

Holynski; et al., "Fast Depth Densification for Occlusion-aware Augmented Reality," ACM Transactions on Graphics, Nov. 2018, vol. 37 (6), Article 194, pp. 1-11.

Hornung; et al., "Interactive Pixel-Accurate Free Viewpoint Rendering from Images with Silhouette Aware Sampling," Computer Graphics, Dec. 2009, pp. 1-13.

International Search Report and Written Opinion for International Application No. PCT/US2020/012238, mailed Mar. 27, 2020, 12 Pages.

International Search Report and Written Opinion for International Application No. PCT/US2020/067020, mailed Apr. 19, 2021, 9 Pages.

International Search Report and Written Opinion for International Application No. PCT/US2020/067055, mailed Apr. 21, 2021, 13 Pages.

International Search Report and Written Opinion for International Application No. PCT/US2021/065655, mailed Mar. 29, 2022, 13 pages.

Kanade; et al., "A Stereo Machine for Video-Rate Dense Depth Mapping and its New Applications," Proceedings of 15th Computer Vision and Pattern Recognition Conference (CVPR), San Francisco, Jun. 18-20, 1996, 07 pages.

Kang; et al., "Extracting View-Dependent Depth Maps from a Collection of Images," International Journal of Computer Vision, Jul. 2004, vol. 58 (2), pp. 139-163.

Khattak S., et al., "A Real-Time Reconstructed 3D Environment Augmented with Virtual Objects Rendered with Correct Occlusion," IEEE Games Media Entertainment, Oct. 22-24, 2014, 8 Pages.

Levin; et al., "Colorization using Optimization," The Hebrew University of Jemsalem, ACM, Inc, Aug. 1, 2004, pp. 689-694.

Lipski; et al., "Virtual Video Camera: Image-Based Viewpoint Navigation Through Space and Time," Computer Graphics, Jan. 1, 2009, 11 pages.

Martino; et al., "An Analysis and Implementation of Multigrid Poisson Solvers with Verified Linear Complexity," Image Processing on Line, 8, Jul. 2018, pp. 192-218.

Matzen; et al., "Low-Cost 360 Stereo Photography and Video Capture," ACM Transactions on Graphics, Jul. 2017, vol. 36 (4), Article 148, pp. 1-13.

Mcmillan; et al., "Plenoptic Modeling: An Image-Based Rendering System," Proceedings of SIGGRAPH 95, Los Angeles, California, Aug. 6-11, 1995, pp. 1-8.

Nover; et al.,"ESPReSSo: Efficient Slanted PatchMatch for Real-time Spacetime Stereo," Google, Sep. 5, 2018, pp. 1-9.

Perez; "Poisson Image Editing," Microsoft Research UK, Jul. 1, 2003, pp. 313-318.

Shum; et al., "Image-Based Rendering," Springer Science Business Media, LLC, Jan. 2007, 425 Pages.

Sinha; et al., "Piecewise Planar Stereo for Image-Based Rendering," Microsoft, Sep. 29, 2009, pp. 1-8.

Stich; "View and Time Interpolation in Image Space," Pacific Graphics, Oct. 2008, vol. 27 (7), pp. 1-7.

Szeliski; "Computer Vision: Algorithms and Applications," Facebook, Aug. 5, 2010, pp. 1-481.

Szeliski; et al., "Locally Adapted Hierarchical Basis Preconditioning," Microsoft Research, May 2006, 38 pages.

Valentin; et al., "Depth from Motion for Smartphone AR," ACM Trans, Graph, Nov. 2018, vol. 37 (6), Article 193, pp. 1-19.

Van Waveren J.M.P., "The Asynchronous Time Warp for Virtual Reality on Consumer Hardware," Proceedings of the 22nd ACM Conference on Virtual Reality Software and technology, VRST, ACM Press, New York, USA, Nov. 2-4, 2016, pp. 37-46, XP058306942.

Vangorp; et al., "Perception of Perspective Distortions in Image-Based Rendering," ACM Transactions on Graphics, Jul. 4, 2013, vol. 32 (4), pp. 1-35.

Vangorp; et al., "Perception of Visual Artifacts in Image-Based Rendering of Facades," Computer Graphics Forum, Wiley, Proceedings of the Eurographics Symposium on Rendering, Jul. 8, 2011, vol. 30 (4), pp. 1-11.

Xiao; et al., "Neuralpassthrough: Learned Real-Time View Synthesis for VR," Special Interest Group on Computer Graphics and Interactive Techniques Conference Proceedings (SIGGRAPH), Aug. 7-11, 2022, 9 pages, Retrieved from the Internet: URL: https://dl.acm.org/doi/pdf/10.1145/3528233.3530701.

Zitnick; et al., "High-Quality Video View Interpolation Using a Layered Representation," ACM Transactions on Graphics (Proc. SIGGRAPH), Aug. 1, 2004, vol. 23, No. 3, pp. 600-608.

(56) References Cited

OTHER PUBLICATIONS

Zitnick; et al., "Stereo for Image-Based Rendering using Image Over-Segmentation," Kluwer Academic Publishers, Jul. 11, 2006, pp. 1-32.

Guizilini V., et al., "Learning Optical Flow, Depth, and Scene Flow Without Real-world Labels," arXiv:2203.15089v2, Jun. 10, 2022, 8 Pages.

International Preliminary Report on Patentability for International Application No. PCT/US2023/034854, mailed Apr. 24, 2025, 14 pages.

International Preliminary Report on Patentability for International Application No. PCT/US2023/034891, mailed Apr. 24, 2025, 10 pages.

International Search Report and Written Opinion for International Application No. PCT/US2023/034854, mailed Jul. 18, 2024, 18 pages.

International Search Report and Written Opinion for International Application No. PCT/US2023/034891, mailed Jan. 30, 2024, 13 pages.

Non-Final Office Action mailed Mar. 25, 2025 for U.S. Appl. No. 18/767,583, filed Jul. 9, 2024, 11 pages.

Office Action mailed Apr. 10, 2025 for Chinese Application No. 202080008174.6, filed Jan. 3, 2020, 1 page.

Office Action mailed Sep. 17, 2025 for Chinese Application No. 202080083121.0, filed Dec. 25, 2020, 7 pages.

Office Action mailed Apr. 24, 2025 for Korean Application No. 10-2022-7027957, filed Dec. 24, 2020, 5 pages.

Office Action mailed Apr. 24, 2025 for Korean Application No. 10-2022-7028616, filed Dec. 25, 2020, 10 pages.

Office Action mailed Jun. 27, 2025 for Chinese Application No. 202080083121.0, filed Dec. 25, 2020, 6 pages.

Office Action mailed Jun. 27, 2025 for Chinese Application No. 202080086666.7, filed Dec. 24, 2020, 8 pages.

Xianfeng L., et al., "Farmland Weed Recognition Method Based on Machine Vision," Beijing University of Technology, Nov. 2011, 7 Pages.

Office Action mailed Nov. 12, 2025 for Korean Application No. 10-2021-7017038, filed Jan. 3, 2020, 7 pages.

* cited by examiner

400

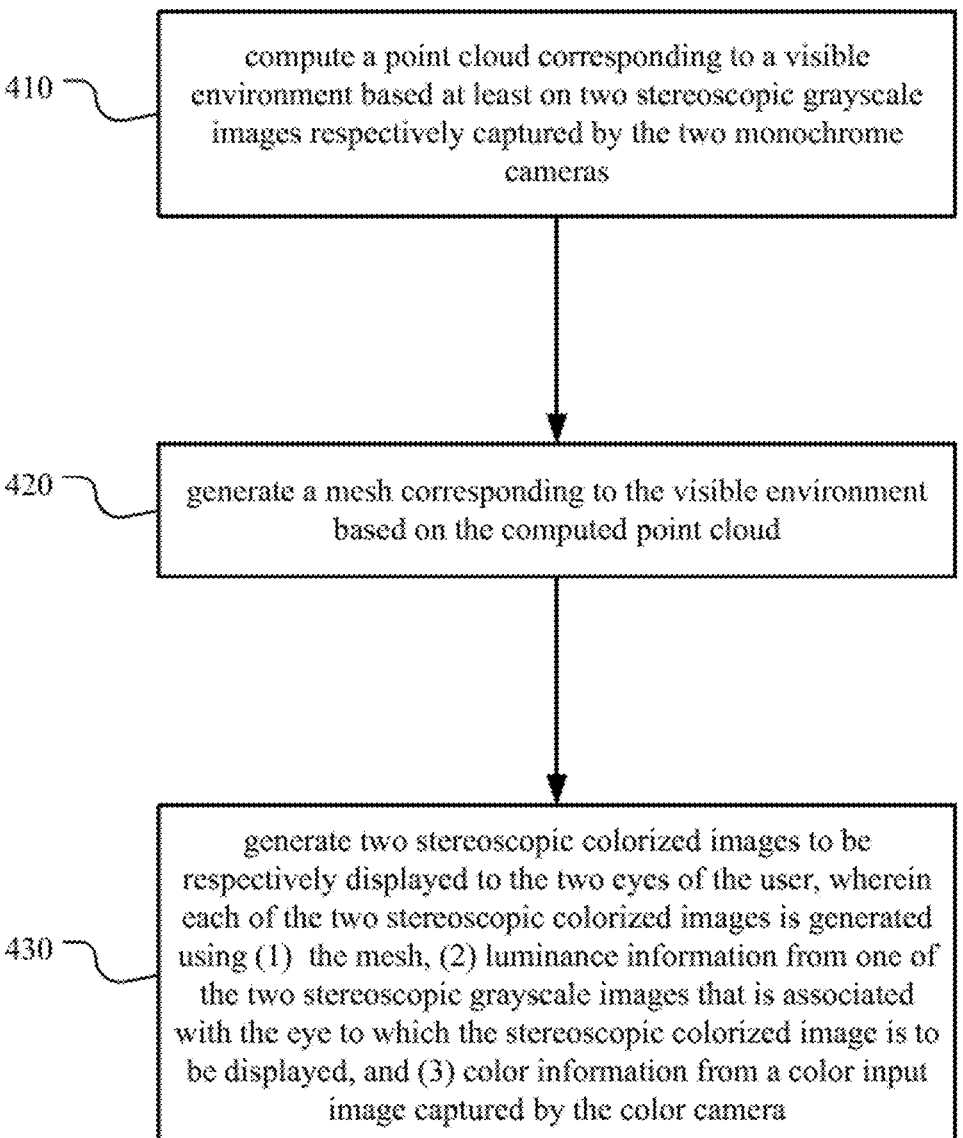

410 — compute a point cloud corresponding to a visible environment based at least on two stereoscopic grayscale images respectively captured by the two monochrome cameras 420 — generate a mesh corresponding to the visible environment based on the computed point cloud 430 — generate two stereoscopic colorized images to be respectively displayed to the two eyes of the user, wherein each of the two stereoscopic colorized images is generated using (1) the mesh, (2) luminance information from one of the two stereoscopic grayscale images that is associated with the eye to which the stereoscopic colorized image is to be displayed, and (3) color information from a color input image captured by the color camera

*FIG. 4*

SYSTEMS, METHODS, AND MEDIA FOR GENERATING VISUALIZATION OF PHYSICAL ENVIRONMENT IN ARTIFICIAL REALITY

PRIORITY

This application claims the benefit under 35 U.S.C. § 119(e) of U.S. Provisional Patent Application No. 63/378, 949, filed 10 Oct. 2022, which is incorporated herein by reference.

TECHNICAL FIELD

This disclosure generally relates to computer graphics and 3D reconstruction techniques.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality.

Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers. When a user is wearing an HMD, the user's vision of the physical environment is occluded by the physical structure of the HMD. For example, the displays of the HMD could be positioned directly in front of and in close proximity to the user's eyes. Thus, whenever the user needs to see the user's physical surroundings, the user would need to remove the HMD. Even if the removal of the HMD is temporary, doing so is inconvenient and disruptive to the user experience.

SUMMARY OF PARTICULAR EMBODIMENTS

"Passthrough" is a feature that allows a user wearing an HMD to see the user's physical surroundings by displaying visual information captured by the HMD's front-facing cameras. Simply displaying the captured images would not work as intended, however. Since the locations of the cameras do not coincide with the locations of the user's eyes, the images captured by the cameras do not accurately reflect the user's perspective. In addition, since the images have no depth, simply displaying the images would not provide the user with proper parallax effects if the user were to shift away from where the images were taken. Incorrect parallax, coupled with user motion, could lead to motion sickness. Thus, to generate correct parallax, particular embodiments of the passthrough feature extracts information about the environment from the captured images (e.g., depth information), use the information to generate a 3D model (a geometric scene representation) of the environment, and reconstruct a scene of the modeled environment from the user's current viewpoint.

Photon-to-visuals latency is another issue addressed by the passthrough feature. The delay between a photon hitting the camera and its appearing on the screen (as part of the captured image) determines the visual comfort of interacting in a dynamic world. Particular embodiments of the passthrough feature overcome this issue by updating the 3D model representation of the environment based on images captured at a sufficiently high rate (e.g., at 30 Hz, 60 Hz, etc.) and rendering images based on the latest known head pose of the user.

To satisfy performance requirements and system constraints (e.g., power, processing, memory, thermal budgets), existing passthrough systems may use monochrome cameras to capture the user's surrounding in grayscale. However, the resulting passthrough experience is also in grayscale, which is not an ideal user experience.

In particular embodiments, a computing system may generate colorized stereoscopic passthrough images based on stereoscopic monochrome images and a color input image. Current designs of artificial reality (e.g., AR/VR) devices may include image sensors (e.g., cameras) with only monochrome cameras to enable features such as, headset tracking, depth detection, monochrome passthrough, and the like. However, to improve upon the user experience, a user may desire color passthrough to enable the user to see images that more closely resemble the real world. The cost of replacing current image sensors that have monochrome cameras with color cameras may be cost-prohibitive. Current algorithms (e.g., headset tracking, depth detection, etc.) may also rely on data received from monochrome cameras. To enable colorized stereoscopic passthrough, a computing system disclosed herein may comprise two monochrome cameras and a color camera. Each monochrome camera may correspond to an eye. The computing system may compute a point cloud corresponding to a visible environment based at least on two stereoscopic grayscale images each captured by a corresponding monochrome camera among the two monochrome cameras. In particular embodiments, the computing system may further comprise a structured light projector that projects an infrared (IR) pattern at a configured frequency. The two monochrome cameras may be synchronized with the structured light projector so that the two monochrome cameras capture IR monochrome images containing reflections of the projected IR pattern at the configured frequency. Between two consecutive monochrome image captures where the structured light projector is active, each of the two monochrome cameras may capture $j$ monochrome images where the projector is inactive and no projected IR pattern reflection is visible, where $j$ is a pre-configured positive integer. The computing system may compute the point cloud further based on the reflections of the projected IR pattern in the IR monochrome images captured by the two monochrome cameras. In particular embodiments, the computing system may subsample points in the point cloud to reduce a number of points in the point cloud. In particular embodiments, a first sampling rate corresponding to a first area may be higher than a second sampling rate corresponding to a second area when the first area has higher gradients than the second area in the two stereoscopic grayscale images. In particular embodiments, the computing system may filter a point in the point cloud with an estimated likelihood of being a non-noise point is lower than a threshold likelihood associated with a location of the point. A first threshold likelihood associated with a first location of the point cloud may be lower than a second threshold likelihood associated with a second location when the first location is within a first threshold distance from the two monochrome cameras and the second location is beyond the first threshold distance from the two monochrome cameras. In particular embodiments, the estimated likelihood for the point of being a non-noise point may be estimated based on a number of consecutive observations of the point in a predetermined number of preceding frames. The threshold likelihood associated with the location may be represented by a minimum number of consecutive observations of the point in the predetermined number of preceding frames.

In particular embodiments, the computing system may generate a mesh corresponding to the visible environment based on the computed point cloud. In particular embodiments, the computing system may generate a plurality of meshes corresponding to the visible environment based on the computed point cloud. For example, the computing system may generate a mesh per monochrome camera or per eye. To generate the mesh corresponding to the point cloud, the computing system may initialize the mesh corresponding to the point cloud as a flat mesh at a pre-determined distance from the two monochrome cameras. For each point in the point cloud, the computing system may perform the following steps to generate a three-dimensional mesh whose portion covering nearby objects are expanded. The computing system may identify a vertex of the mesh corresponding to the point. The computing system may warp the identified vertex to a location of the point in the point cloud. The computing system may determine whether the point in the point cloud is within a second threshold distance. When the computing system determines that the point in the point cloud is within the second threshold distance, the computing system may warp k vertices nearest to the identified vertex to the location of the point, where k is a pre-determined positive integer.

In particular embodiments, the computing system may generate two stereoscopic colorized images to be respectively displayed to the two eyes of the user. Each of the two stereoscopic colorized images may be generated using (1) the mesh, (2) luminance information from one of the two stereoscopic grayscale images that is associated with the eye to which the stereoscopic colorized image is to be displayed, and (3) color information from a color input image captured by the color camera. To render each vertex in the mesh for generating each of the two stereoscopic colorized images, the computing system may identify a first corresponding pixel in the corresponding grayscale image by performing a raycasting from the vertex into a corresponding monochrome camera that captures the corresponding grayscale image. The computing system may also identify a second corresponding pixel in the color input image by performing a raycasting from the vertex into the color camera. The computing system may convert first red, green, blue (RGB) values associated with the second corresponding pixel into second color information in a second color space. A luminance level indicator may be separated from one or more color information indicators in the second color space. In particular embodiments, the second color space may be a CIELAB color space, where the luminance level indicator may be orthogonal to the chrominance indicating values. The computing system may replace the luminance level indicator in the second color information with a value corresponding to a luminance level associated with the first corresponding pixel in the corresponding grayscale image.

The computing system may convert the second color information into second RGB values. The computing system may render the vertex with the second RGB values.

In particular embodiments, the computing system may further comprise two displays. The computing system may present each of the two stereoscopic colorized images to a corresponding display among the two displays.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates an example method for generating colorized stereoscopic passthrough images based on a two grayscale images and a color image.

DESCRIPTION OF EXAMPLE EMBODIMENTS

"Passthrough" is a feature that allows a user wearing an HMD to see the user's physical surroundings by displaying visual information captured by the HMD's front-facing cameras. Simply displaying the captured images would not work as intended, however. Since the locations of the cameras do not coincide with the locations of the user's eyes, the images captured by the cameras do not accurately reflect the user's perspective. In addition, since the images have no depth, simply displaying the images would not provide the user with proper parallax effects if the user were to shift away from where the images were taken. Incorrect parallax, coupled with user motion, could lead to motion sickness. Thus, to generate correct parallax, particular embodiments of the passthrough feature extracts information about the environment from the captured images (e.g., depth information), use the information to generate a 3D model (a geometric scene representation) of the environment, and reconstruct a scene of the modeled environment from the user's current viewpoint.

Photon-to-visuals latency is another issue addressed by the passthrough feature. The delay between a photon hitting the camera and it's appearing on the screen (as part of the captured image) determines the visual comfort of interacting in a dynamic world. Particular embodiments of the passthrough feature overcomes this issue by updating the 3D model representation of the environment based on images captured at a sufficiently high rate (e.g., at 30 Hz, 60 Hz, etc.) and rendering images based on the latest known head pose of the user.

To satisfy performance requirements and system constraints (e.g., power, processing, memory, thermal budgets), existing passthrough systems may use monochrome cameras to capture the user's surrounding in grayscale. However, the resulting passthrough experience is also in grayscale, which is not an ideal user experience.

In particular embodiments, a computing system may generate colorized stereoscopic passthrough images based on stereoscopic monochrome images and a color input image. Current designs of artificial reality (e.g., AR/VR) devices may include image sensors (e.g., cameras) with only monochrome cameras to enable features such as, headset tracking, depth detection, monochrome passthrough, and the like. However, to improve upon the user experience, a user may desire color passthrough to enable the user to see images that more closely resemble the real world. The cost of replacing current image sensors that have monochrome cameras with color cameras may be cost-prohibitive. Current algorithms (e.g., headset tracking, depth detection, etc.) may also rely on data received from monochrome cameras. To enable colorized stereoscopic passthrough, a computing system disclosed herein may comprise two monochrome cameras and a color camera. Each monochrome camera may correspond to an eye.

Figure 1A:
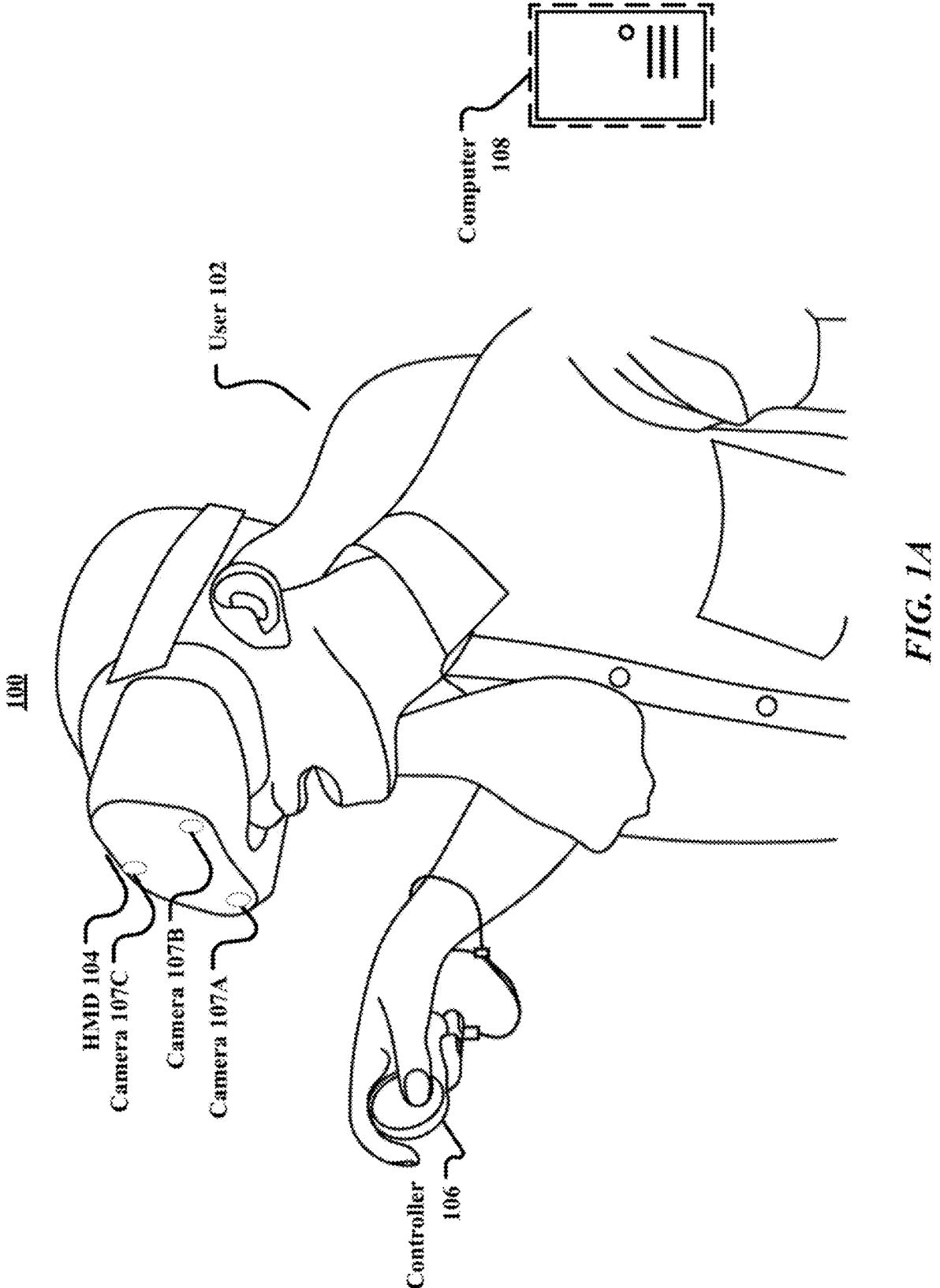
FIG. 1A illustrates an example artificial reality system worn by a user, in accordance with particular embodiments.

FIG. 1A illustrates an example of an artificial reality system 100 worn by a user 102. In particular embodiments, the artificial reality system 100 may comprise a head-mounted device ("HMD") 104, a controller 106, and a computer 108. The HMD 104 may be worn over the user's eyes and provide visual content to the user 102 through internal displays (not shown). The HMD 104 may have two separate internal displays, one for each eye of the user 102. As illustrated in FIG. 1A, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical environment surrounding him, as the user's vision is shielded by the HMD 104. As such, the passthrough feature described herein is needed to provide the user with real-time visual information about the user's physical surroundings. The HMD 104 may comprise several external facing cameras 107A-107C. In particular embodiments, the cameras 107A and 107B may be monochrome cameras while the camera 107C may be a color camera.

Figure 1B:
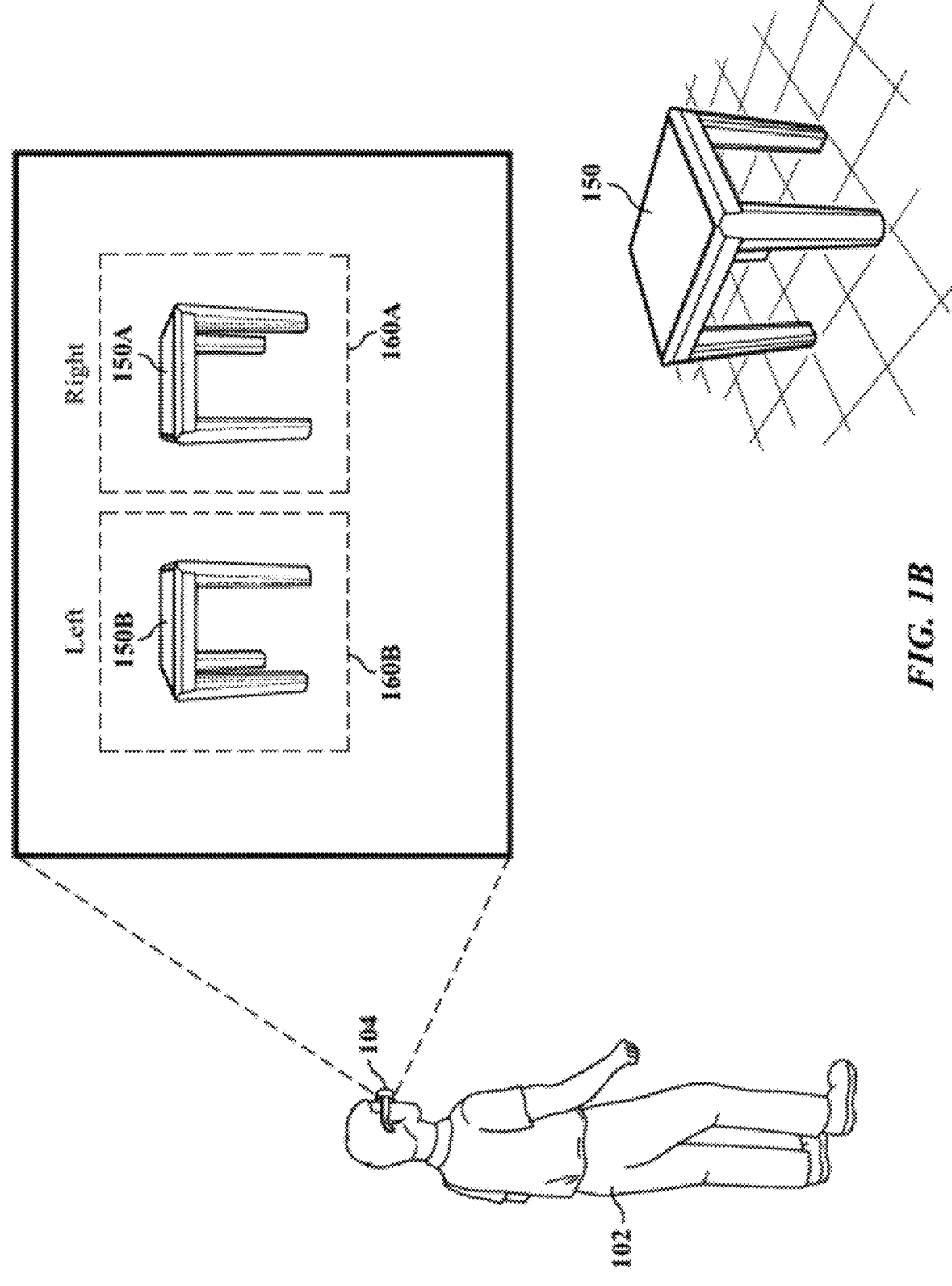
FIG. 1B illustrates an example of a passthrough feature, in accordance with particular embodiments.

FIG. 1B illustrates an example of the passthrough feature. A user 102 may be wearing an HMD 104, immersed within a virtual reality environment. A physical table 150 is in the physical environment surrounding the user 102. However, due to the HMD 104 blocking the vision of the user 102, the user 102 is unable to see the table 150 directly. To help the user perceive his physical surroundings while wearing the HMD 104, the passthrough feature captures information about the physical environment using, for example, the aforementioned external-facing cameras 107A-107C. While the HMD 104 has three external-facing cameras 107A-107C, any combination of the cameras 107A-107C may be used to perform the functions as described herein. As an example and not by way of limitation, cameras 107A-107B may be used to perform one or more functions as described herein. The captured information may then be re-projected to the user 102 based on the user's viewpoints. In particular embodiments where the HMD 104 has a right display 160A for the user's right eye and a left display 160B for the user's left eye, the system 100 may individually render (1) a re-projected view 150A of the physical environment for the right display 160A based on a viewpoint of the user's right eye and (2) a re-projected view 150B of the physical environment for the left display 160B based on a viewpoint of the user's left eye.

Referring again to FIG. 1A, the HMD 104 may have external-facing cameras, such as the three forward-facing cameras 107A-107C shown in FIG. 1A. While only three forward-facing cameras 107A-C are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of the environment behind the user, and/or an internal camera for capturing the user's eye gaze for eye-tracking purposes). The external-facing cameras are configured to capture the physical environment around the user and may do so continuously to generate a sequence of frames (e.g., as a video).

The 3D representation may be generated based on depth measurements of physical objects observed by the cameras 107A and 107B. Depth may be measured in a variety of ways. In particular embodiments, depth may be computed based on stereo images. For example, the cameras 107A and 107B may share an overlapping field of view and be configured to capture images simultaneously. As a result, the same physical object may be captured by the cameras 107A and 107B at the same time. For example, a particular feature of an object may appear at one pixel $p_A$ in the image captured by camera 107A, and the same feature may appear at another pixel $p_B$ in the image captured by camera 107B. As long as the depth measurement system knows that the two pixels correspond to the same feature, it could use triangulation techniques to compute the depth of the observed feature. For example, based on the camera 107A's position within a 3D space and the pixel location of $p_A$ relative to the camera 107A's field of view, a line could be projected from the camera 107A and through the pixel $p_A$. A similar line could be projected from the other camera 107B and through the pixel $p_B$. Since both pixels are supposed to correspond to the same physical feature, the two lines should intersect. The two intersecting lines and an imaginary line drawn between the two cameras 107A and 107B form a triangle, which could be used to compute the distance of the observed feature from either camera 107A or 107B or a point in space where the observed feature is located.

In particular embodiments, the pose (e.g., position and orientation) of the HMD 104 within the environment may be needed. For example, in order to render the appropriate display for the user 102 while the user 102 is moving about in a virtual environment, the system 100 would need to determine the user's position and orientation at any moment.

Based on the pose of the HMD, the system 100 may further determine the viewpoint of either of the cameras 107A-107C or either of the user's eyes. In particular embodiments, the HMD 104 may be equipped with inertial-measurement units ("IMU"). The data generated by the IMU, along with the stereo imagery captured by the external-facing cameras 107A-107B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104, or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depend on the capabilities of its computer unit 108.

Figure 2:
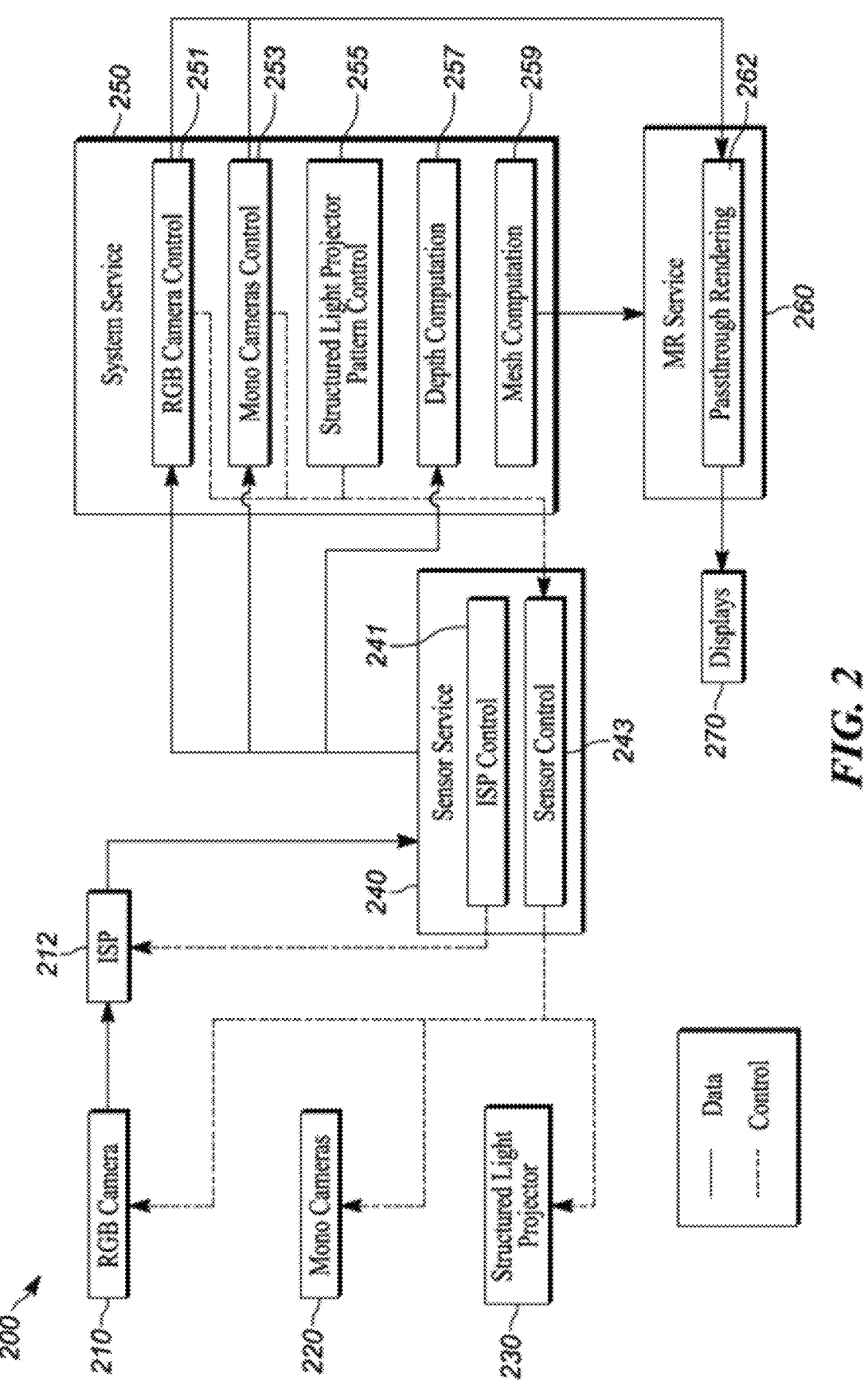
FIG. 2 illustrates an example logical architecture of a computing system for colorized stereoscopic passthrough.

FIG. 2 illustrates an example logical architecture 200 of a computing system for colorized stereoscopic passthrough. The computing system 100 may comprise an RGB camera 210 and two monochrome cameras 220. The computing system 100 may also comprise an image signal processor (ISP) 212 that performs post-processing on the signal output from the RGB camera 210. In particular embodiments, the computing system 100 may further comprise a structured light projector 230 that projects an infrared (IR) pattern. In particular embodiments, the computing system 100 may comprise displays 270 located close to user's eyes. The computing system 100 may comprise a sensor service 240, a system service 250 and an MR service 260 with regard to the colorized stereoscopic passthrough. Each service may comprise one or more units that run algorithms. The sensor service 240 may comprise an ISP control unit 241 that controls the ISP 212 and a sensor control unit 243 that controls the RGB camera 210, the monochrome cameras 220, and the structured light projector 230. The system service 250 may comprise an RGB camera control unit 251 that controls the RGB camera 210 through the sensor control unit 243. The RGB camera control unit 251 may also receive color image data captured by the RGB camera 210. The system service 250 may also comprise a monochrome cameras control unit 253 that controls the monochrome cameras 220 through the sensor control unit 243. The monochrome cameras control unit 253 may also receive grayscale image data captured by the monochrome cameras 220. The system service 250 may also comprise a structured light projector pattern control unit 255 that controls the structured light projector 230 through the sensor control unit 243. The system service may further comprise a depth computation unit 257 that computes a point cloud based on IR and/or non-IR stereoscopic monochrome images captured by the monochrome cameras 220. The system service may further comprise a mesh computation unit 259 that computes a three-dimensional mesh based on the point cloud generated by the depth computation unit 257. The MR service 260 may comprise a passthrough rendering unit 262 that renders colorized stereoscopic passthrough images based on the mesh generated by the mesh computation unit 259 and a color image captured by the RGB camera 210, and stereoscopic grayscale images captured by the monochrome cameras 220. The colorized stereoscopic passthrough images may be presented on the displays 270. Although this disclosure describes a particular logical architecture of a computing system for colorized passthrough, this disclosure contemplates any suitable logical architecture of a computing system for colorized passthrough.

Passthrough consists of sensitive data, namely camera images, three-dimensional meshes and rendered images. The software architecture guarantees data privacy by the following:

Hidden from client applications. Sensitive data is generated/consumed within MR service 260 and the system service 250. No API may be available to the client applications to access images, rendered eye-buffers and three-dimensional data. Sensitive data is never made available to the client applications' memory space and remains within system services.

Sensitive data may be generated by cameras/intermediate algorithms and consumed on-the-fly. No data may be persisted on disk.

Sensitive data may not be sent as telemetry to servers. Only non-sensitive telemetry consisting of computation rate, latency, is sent.

Figure 3:
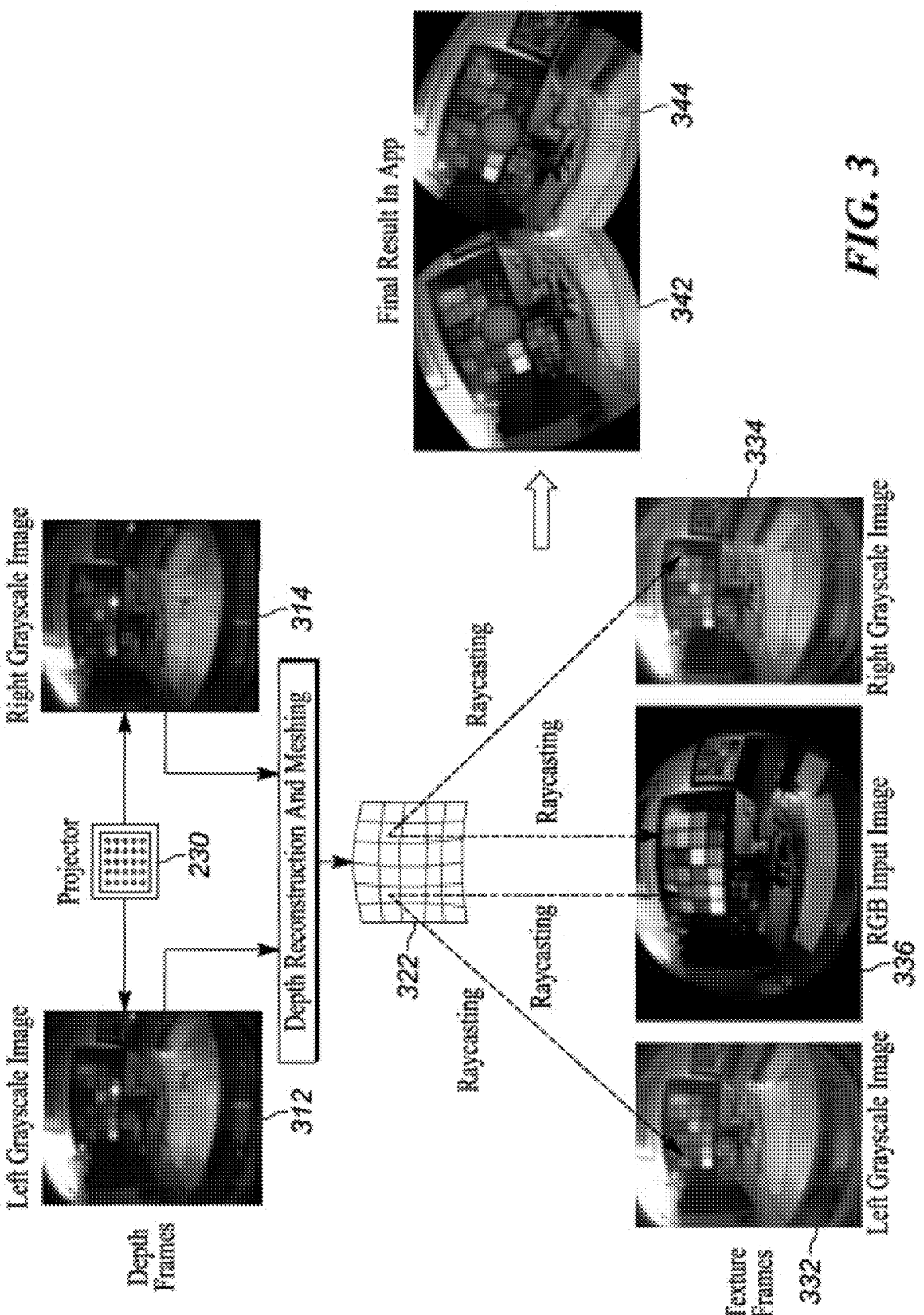
FIG. 3 illustrates an example diagram for generating colorized stereoscopic passthrough images.

In particular embodiments, a computing system 100 may comprise a color camera 210 and two monochrome cameras 220. Each monochrome camera may correspond to an eye. FIG. 3 illustrates an example diagram for generating colorized stereoscopic passthrough images. The computing system 100 may compute a point cloud corresponding to a visible environment based at least on two stereoscopic grayscale images 312 and 314 each captured by a corresponding monochrome camera among the two monochrome cameras 220. As an example and not by way of limitation, the depth computation unit 257 may generate a point cloud based on stereoscopic monochrome images 312 and 314 captured by the monochrome cameras 220. Capturing rate of the monochrome cameras 220 may be controlled by the monochrome cameras control unit 253. In particular embodiments, the monochrome cameras 220 may capture stereoscopic monochrome images at, e.g., 30 Hz. The depth computation unit 257 may generate a point cloud using a portion of those frames. Another portion of those frames may be used for the passthrough texture by the passthrough rendering unit 262. For example, the portion of frames captured by the monochrome cameras 220 used for point cloud computation ("depth frames") may be every odd frame (e.g., 15 Hz), and the portion of frames captured by the monochrome cameras 220 used for passthrough texture ("texture frames") maybe every even frame (e.g., 15 Hz).

Although this disclosure describes computing a point cloud based on stereoscopic grayscale images in a particular manner, this disclosure contemplates computing a point cloud based on stereoscopic grayscale images in any suitable manner.

In particular embodiments, the computing system 100 may comprise the structured light projector 230 that projects an IR pattern at a frequency configured by the structured light projector pattern control unit 255 through the sensor control unit 243. The sensor control unit 243 may synchronize the two monochrome cameras 220 with the structured light projector 230 so that the two monochrome cameras 220 capture IR monochrome images containing reflections of the projected IR pattern at the configured frequency. Between two consecutive monochrome image captures where the structured light projector is active, each of the two monochrome cameras may capture j monochrome images where the projector is inactive and no projected IR pattern reflection is visible, where j is a pre-configured positive integer. The computing system 100 may compute the point cloud further based on the reflections of the projected IR pattern in the IR monochrome images captured by the two monochrome cameras 220. As an example and not by way of limitation, the monochrome cameras 220 may be configured to capture three non-IR image frames between two consecutive IR image frames, where an IR image indicates an image containing the projected IR pattern reflection and a non-IR image indicates an image without the projected IR pattern reflection. The IR image capturing may be synchronized with the projections of the IR pattern. Thus, the IR images may contain the reflection of the projected IR pattern. The depth computation unit 257 may also utilize the IR image frames containing reflections of the IR pattern for computing the point cloud. Although this disclosure describes computing a point cloud further based on IR images containing reflections of the projected IR pattern in a particular manner, this disclosure contemplates computing a point cloud further based on IR images containing reflections of the projected IR pattern in any suitable manner.

In particular embodiments, the computing system 100 may subsample points in the point cloud to reduce a number of points in the point cloud. In particular embodiments, a first sampling rate corresponding to a first area may be higher than a second sampling rate corresponding to a second area when the first area has higher gradients than the second area in the two stereoscopic grayscale images. As an example and not by way of limitation, after generating the point cloud, the depth computation unit 257 may subsample points from the generated point cloud to reduce the number of points in the point cloud from 30,000 points to between 6,000 and 15,000 points by retaining points in high contrast areas. The high contrast areas may have higher chance to belong to edges. The subsampling may reduce the number of points to a tractable number so that the subsequent step of temporal outlier suppression can be performed within acceptable latency bounds. Although this disclosure describes subsampling points in a point cloud in a particular manner, this disclosure contemplates subsampling points in a point cloud in any suitable manner.

In particular embodiments, the computing system 100 may filter a point in the point cloud with an estimated likelihood of being a non-noise point is lower than a threshold likelihood associated with a location of the point. In particular embodiments, the likelihood of a point being a non-noise point may be estimated based on temporal consistency in recently preceding frames. The estimated likelihood for the point of being a non-noise point may be determined based on a number of consecutive observations of the point in a predetermined number of preceding frames. When the point has been appeared in the recently preceding frames, the point has a high likelihood of being non-noise. The threshold likelihood associated with the location may be represented by a minimum number of consecutive observations of the point in the predetermined number of preceding frames. In particular embodiments, a first threshold likelihood associated with a first location of the point cloud may be lower than a second threshold likelihood associated with a second location when the first location is within a first threshold distance from the two monochrome cameras and the second location is beyond the first threshold distance from the two monochrome cameras. A nearby object may move faster than another object far from the cameras. Thus, points corresponding to the nearby object may have not been observed for long in the preceding frames. The computing system 100 may have a low threshold likelihood for points within the first threshold distance. As an example and not by way of limitation, the first threshold distance may be 60 cm. Typically, hands of the user may be observed within 60 cm from the monochrome cameras 220. The depth computation unit 257 may examine preceding frames for determining whether filter out a point from the point cloud for the current frame. If the point has been observed in two consecutive frames among the examined preceding frames, the depth computation unit 257 may record one upvote for the point. When the point has been observed in one frame and not been observed in an immediately neighboring frame, the depth computation unit 257 may record one downvote for the point. For example, the depth computation unit 257 may keep a point within 60 cm when the point has six or more upvotes in the 30 recently preceding frames. The depth computation unit 257 may keep a point outside 60 cm when the point has 20 or more upvotes in the 30 recently preceding frames. In particular embodiments, the depth computation unit 257 may discard a point from the point cloud if downvotes for the point exceeds a threshold number associated with an area of the point. Although this disclosure describes filtering points in a point cloud based on temporal consistency in a particular manner, this disclosure contemplates filtering points in a point cloud based on temporal consistency in any suitable manner.

In particular embodiments, the computing system 100 may generate a mesh 322 corresponding to the visible environment based on the computed point cloud. The computing system 100 may expand a portion of the mesh 322 when the portion corresponds to a foreground object in order to enable more accurate representation on the foreground object. To generate the mesh 322 corresponding to the point cloud, the computing system 100 may initialize the mesh 322 corresponding to the point cloud as a flat mesh at a pre-determined distance from the two monochrome cameras 220. For each point in the point cloud, the computing system 100 may perform the following steps to generate a three-dimensional mesh 322 whose portion covering nearby objects are expanded. The computing system 100 may identify a vertex of the mesh 322 corresponding to the point. The computing system 100 may warp the identified vertex to a location of the point in the three-dimensional space. The computing system 100 may determine whether the point in the point cloud is within a second threshold distance. When the computing system 100 determines that the point is within the second threshold distance, the computing system 100 may warp k vertices nearest to the identified vertex to the location of the point in the three-dimensional space, where k is a pre-determined positive integer. In particular embodiments, the computing system 100 may generate a plurality of meshes corresponding to the visible environment based on the computed point cloud. For example, the computing system 100 may generate a mesh per monochrome camera or per eye. After generating a single mesh 322 based on the computed point cloud, the computing system 100 may warp the mesh 322 to generate two warped meshes: one for the left eye (i.e., the warped mesh represents how the mesh would be observed by the left monochrome camera) and another warped mesh for the right eye (i.e., the warped mesh represents how the mesh would be observed by the right monochrome camera). As an example and not by way of limitation, the mesh computation unit 259 may initialize a flat mesh at 2 meters from the monochrome cameras 220. For each point in the point cloud, the mesh computation unit 259 may warp a corresponding vertex in the mesh 322 towards the point in the three-dimensional space. When a point is within 60 cm from the monochrome cameras 220, the mesh computation unit 259 may also warp four nearest vertices of the corresponding vertex in the mesh towards the location of the point in the three-dimensional space. In implementation, the four nearest vertices may be warped close to the location of the point. The effect of these steps would be warping larger mesh patches corresponding to nearby objects. Although this disclosure describes generating a three-dimensional mesh based on a point cloud in a particular manner, this disclosure contemplates generating a three-dimensional mesh based on a point cloud in any suitable manner.

In particular embodiments, the computing system 100 may generate two stereoscopic colorized images to be respectively displayed to the two eyes of the user. Each of the two stereoscopic colorized images may be generated using (1) the mesh 322, (2) luminance information from one of the two stereoscopic grayscale images 332 and 334 that is associated with the eye to which the stereoscopic colorized image is to be displayed, and (3) color information from a color input image 336 captured by the color camera 210. The stereoscopic colorized images are "stereoscopic" because the rendering uses luma or grayscale intensity for the left image from the left monochrome camera and the right image from the right monochrome camera. If the luma or grayscale intensity is not used for rendering, the parallax effects and an emersion on the output colorized images may be degraded. The stereoscopic colorized images are "colorized" because the grayscale intensities are mixed with chroma components from the color input image 336 captured by the color camera 210. To render each vertex in the mesh 322 for generating each of the two stereoscopic colorized images, the computing system 100 may identify a first corresponding pixel in the corresponding grayscale image by performing a ray-casting from the vertex into a corresponding monochrome camera that captures the corresponding grayscale image. The computing system 100 may also identify a second corresponding pixel in the color input image by performing a ray-casting from the vertex into the color camera. As an example and not by way of limitation, to render a left colorized image 342, the passthrough rendering unit 262 may perform a raycasting from a position corresponding to a vertex in the mesh 322 to the left monochrome camera to identify a first pixel in the left grayscale image 332 corresponding to the vertex for the left colorized passthrough image. The passthrough rendering unit 262 may also perform a raycasting from the position corresponding to the same vertex in the mesh 322 to the RGB camera 210 to identify a second pixel in the color input image 336 corresponding to the vertex for the left colorized passthrough image. Although this disclosure describes identifying one pixel from a corresponding grayscale image and one pixel from a color input image for blending color information for a vertex in the mesh in a particular manner, this disclosure contemplates identifying one pixel from a corresponding grayscale image and one pixel from a color input image for blending color information for a vertex in the mesh in any suitable manner.

In particular embodiments, the computing system 100 may convert first RGB values associated with the second corresponding pixel into second color information in a second color space. A luminance level indicator may be separated from one or more color information indicators in the second color space. In particular embodiments, the second color space may be a CIELAB color space, where the luminance level indicator may be orthogonal to the chrominance indicating values. In CIELAB color space, L* represents a lightness, a* represents a red/green value, and b* represents blue/yellow value. The computing system 100 may replace the luminance level indicator in the second color information with a value corresponding to a luminance level associated with the first corresponding pixel in the corresponding grayscale image. The computing system 100 may convert the second color information into second RGB values. The computing system 100 may render the vertex with the second RGB values. As an example and not by way of limitation, continuing with the prior example, the passthrough rendering unit 262 may convert the RGB values of the second pixel in the color input image 336 into CIELAB color space values, in which L* indicates a lightness of the second pixel in the color input image 336. The passthrough rendering unit 262 may replace the L* value in the converted CIELAB color space values with a value indicating a luminance level of the first pixel in the left grayscale image 332. The passthrough rendering unit 262 may convert the CIELAB color space values into RGB color space values. The output RGB color space values may comprise luminance information from the first pixel of the left grayscale image 332 and color information from the second pixel of the color input image 336. The passthrough rendering unit 262 may render the vertex in the mesh 322 with the output RGB color space values to generate left colorized passthrough image 342. The right colorized passthrough image 344 may be generated in a similar manner using the right grayscale image 334 and the color input image 336. Although this disclosure describes rendering a vertex of a mesh with luminance information from a grayscale input image and color information from a color input image in a particular manner, this disclosure contemplates rendering a vertex of a mesh with luminance information from a grayscale input image and color information from a color input image in any suitable manner.

In particular embodiments, the computing system 100 may further comprise two displays 270, each corresponding to an eye. The computing system 100 may present each of the two stereoscopic colorized images to a corresponding display among the two displays. As an example and not by way of limitation, a left colorized image may be presented on a left display among the two displays 270. Also, a right colorized image may be presented on a right display among the two displays 270. Although this disclosure describes presenting stereoscopic colorized images to two displays corresponding to eyes of the user in a particular manner, this disclosure contemplates presenting stereoscopic colorized images to two displays corresponding to eyes of the user in any suitable manner.

FIG. 4 illustrates an example method 400 for generating colorized stereoscopic passthrough images based on a two grayscale images and a color image. The method may begin at step 410, where a computing system comprising a color camera and two monochrome cameras respectively associated with two eyes of a user may compute a point cloud corresponding to a visible environment based at least on two stereoscopic grayscale images respectively captured by the two monochrome cameras. In particular embodiments, the computing system may be embodied as an artificial reality system. At step 420, the computing system may generate a mesh corresponding to the visible environment based on the computed point cloud. At step 430, the computing system may generate two stereoscopic colorized images to be respectively displayed to the two eyes of the user, wherein each of the two stereoscopic colorized images is generated using (1) the mesh, (2) luminance information from one of the two stereoscopic grayscale images that is associated with the eye to which the stereoscopic colorized image is to be displayed, and (3) color information from a color input image captured by the color camera.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for generating colorized stereoscopic passthrough images based on a two grayscale images and a color image, including the particular steps of the method of FIG. 4, this disclosure contemplates any suitable method for generating colorized stereoscopic passthrough images based on a two grayscale images and a color image, including any suitable steps, which may include a subset of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
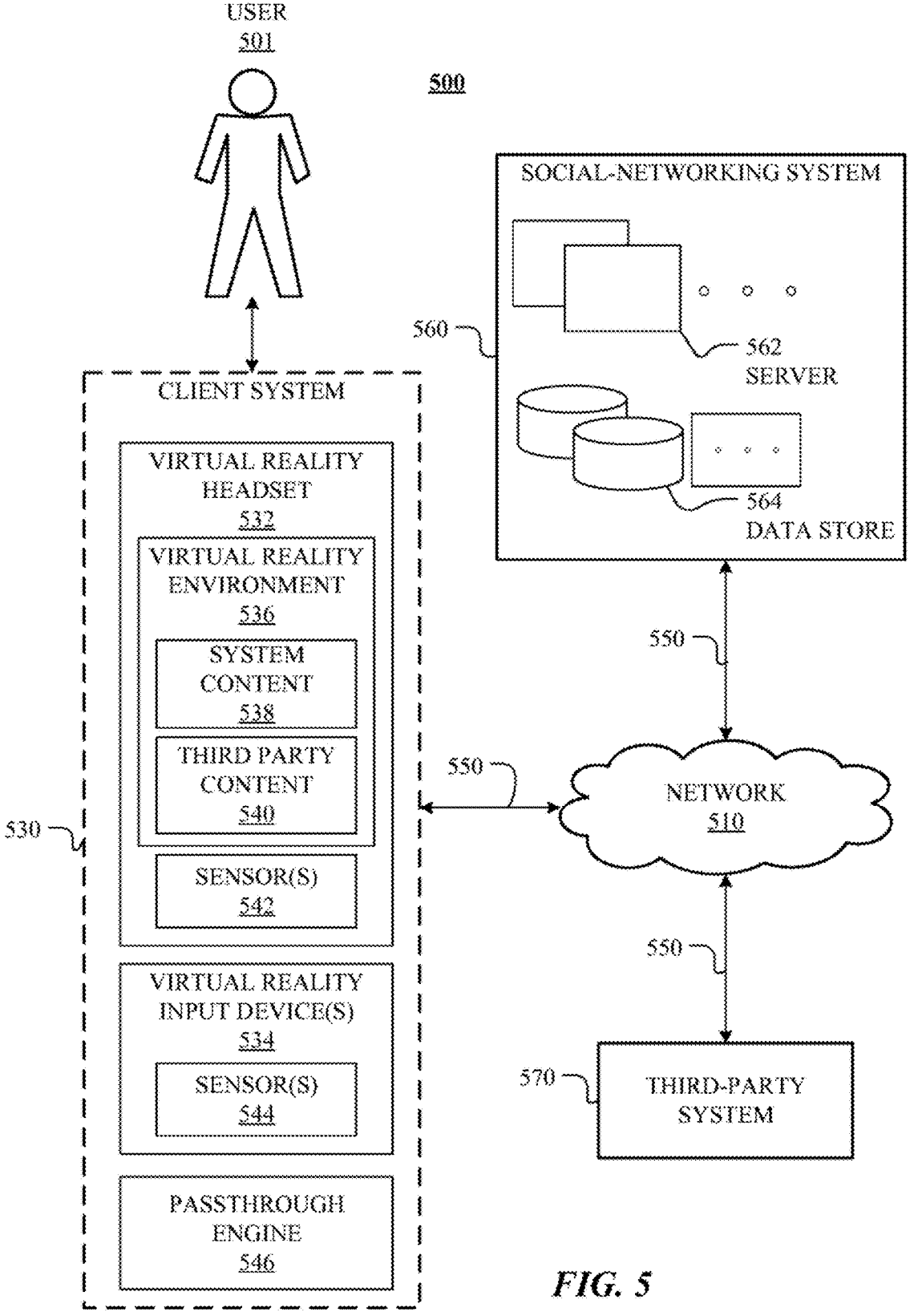
FIG. 5 illustrates an example network environment associated with a VR or social-networking system.

FIG. 5 illustrates an example network environment 500 associated with a virtual reality system. Network environment 500 includes a user 501 interacting with a client system 530, a social-networking system 560, and a third-party system 570 connected to each other by a network 510. Although FIG. 5 illustrates a particular arrangement of a user 501, a client system 530, a social-networking system 560, a third-party system 570, and a network 510, this disclosure contemplates any suitable arrangement of a user 501, a client system 530, a social-networking system 560, a third-party system 570, and a network 510. As an example and not by way of limitation, two or more of a user 501, a client system 530, a social-networking system 560, and a third-party system 570 may be connected to each other directly, bypassing a network 510. As another example, two or more of a client system 530, a social-networking system 560, and a third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple users 501, client systems 530, social-networking systems 560, third-party systems 570, and networks 510.

This disclosure contemplates any suitable network 510. As an example and not by way of limitation, one or more portions of a network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 510 may include one or more networks 510.

Links 550 may connect a client system 530, a social-networking system 560, and a third-party system 570 to a communication network 510 or to each other. This disclosure contemplates any suitable links 550. In particular embodiments, one or more links 550 include one or more wireline (such as for example Digital Subscriber Line (DSL) or Data Over Cable Service Interface Specification (DOC-SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout a network environment 500. One or more first links 550 may differ in one or more respects from one or more second links 550.

In particular embodiments, a client system 530 may be an electronic device including hardware, software, or embedded logic components or a combination of two or more such components and capable of carrying out the appropriate functionalities implemented or supported by a client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 530. A client system 530 may enable a network user at a client system 530 to access a network 510. A client system 530 may enable its user to communicate with other users at other client systems 530. A client system 530 may generate a virtual reality environment for a user to interact with content.

In particular embodiments, a client system 530 may include a virtual reality (or augmented reality) headset 532, such as OCULUS RIFT and the like, and virtual reality input device(s) 534, such as a virtual reality controller. A user at a client system 530 may wear the virtual reality headset 532 and use the virtual reality input device(s) to interact with a virtual reality environment 536 generated by the virtual reality headset 532. Although not shown, a client system 530 may also include a separate processing computer and/or any other component of a virtual reality system. A virtual reality headset 532 may generate a virtual reality environment 536, which may include system content 538 (including but not limited to the operating system), such as software or firmware updates and also include third-party content 540, such as content from applications or dynamically downloaded from the Internet (e.g., web page content). A virtual reality headset 532 may include sensor(s) 542, such as accelerometers, gyroscopes, magnetometers to generate sensor data that tracks the location of the headset device 532. The headset 532 may also include eye trackers for tracking the position of the user's eyes or their viewing directions. The client system may use data from the sensor(s) 542 to determine velocity, orientation, and gravitation forces with respect to the headset. Virtual reality input device(s) 534 may include sensor(s) 544, such as accelerometers, gyroscopes, magnetometers, and touch sensors to generate sensor data that tracks the location of the input device 534 and the positions of the user's fingers. The client system 530 may make use of outside-in tracking, in which a tracking camera (not shown) is placed external to the virtual reality headset 532 and within the line of sight of the virtual reality headset 532. In outside-in tracking, the tracking camera may track the location of the virtual reality headset 532 (e.g., by tracking one or more infrared LED markers on the virtual reality headset 532). Alternatively or additionally, the client system 530 may make use of inside-out tracking, in which a tracking camera (not shown) may be placed on or within the virtual reality headset 532 itself. In inside-out tracking, the tracking camera may capture images around it in the real world and may use the changing perspectives of the real world to determine its own position in space.

In particular embodiments, client system 530 (e.g., an HMD) may include a passthrough engine 546 to provide the passthrough feature described herein, and may have one or more add-ons, plug-ins, or other extensions. A user at client system 530 may connect to a particular server (such as server 562, or a server associated with a third-party system 570). The server may accept the request and communicate with the client system 530.

Third-party content 540 may include a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at a client system 530 may enter a Uniform Resource Locator (URL) or other address directing a web browser to a particular server (such as server 562, or a server associated with a third-party system 570), and the web browser may generate a Hyper Text Transfer Protocol (HTTP) request and communicate the HTTP request to server. The server may accept the HTTP request and communicate to a client system 530 one or more Hyper Text Markup Language (HTML) files responsive to the HTTP request. The client system 530 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SIL-VERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 560 may be a network-addressable computing system that can host an online social network. The social-networking system 560 may generate, store, receive, and send social-networking data, such as, for example, user-profile data, concept-profile data, social-graph information, or other suitable data related to the online social network. The social-networking system 560 may be accessed by the other components of network environment 500 either directly or via a network 510. As an example and not by way of limitation, a client system 530 may access the social-networking system 560 using a web browser of a third-party content 540, or a native application associated with the social-networking system 560 (e.g., a mobile social-networking application, a messaging application, another suitable application, or any combination thereof) either directly or via a network 510. In particular embodiments, the social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, the social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, the social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. The social-networking system 560 may provide users of the online social network the ability to communicate and interact with other users. In particular embodiments, users may join the online social network via the social-networking system 560 and then add connections (e.g., relationships) to a number of other users of the social-networking system 560 whom they want to be connected to. Herein, the term "friend" may refer to any other user of the social-networking system 560 with whom a user has formed a connection, association, or relationship via the social-networking system 560.

In particular embodiments, the social-networking system 560 may provide users with the ability to take actions on various types of items or objects, supported by the social-networking system 560. As an example and not by way of limitation, the items and objects may include groups or social networks to which users of the social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 560 or by an external system of a third-party system 570, which is separate from the social-networking system 560 and coupled to the social-networking system 560 via a network 510.

In particular embodiments, the social-networking system 560 may be capable of linking a variety of entities. As an example and not by way of limitation, the social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating the social-networking system 560. In particular embodiments, however, the social-networking system 560 and third-party systems 570 may operate in conjunction with each other to provide social-networking services to users of the social-networking system 560 or third-party systems 570. In this sense, the social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 560 also includes user-generated content objects, which may enhance a user's interactions with the social-networking system 560. User-generated content may include anything a user can add, upload, send, or "post" to the social-networking system 560. As an example and not by way of limitation, a user communicates posts to the social-networking system 560 from a client system 530. Posts may include data such as status updates or other textual data, location information, photos, videos, links, music or other similar data or media. Content may also be added to the social-networking system 560 by a third-party through a "communication channel," such as a newsfeed or stream.

In particular embodiments, the social-networking system 560 may include a variety of servers, sub-systems, programs, modules, logs, and data stores. In particular embodiments, the social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 560 may also include suitable components such as network interfaces, security mechanisms, load balancers, failover servers, management-and-network-operations consoles, other suitable components, or any suitable combination thereof. In particular embodiments, the social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 560 to one or more client systems 530 or one or more third-party systems 570 via a network 510. The web server may include a mail server or other messaging functionality for receiving and routing messages between the social-networking system 560 and one or more client systems 530. An API-request server may allow a third-party system 570 to access information from the social-networking system 560 by calling one or more APIs. An action logger may be used to receive communications from a web server about a user's actions on or off the social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from a client system 530 responsive to a request received from a client system 530. Authorization servers may be used to enforce one or more privacy settings of the users of the social-networking system 560. A privacy setting of a user determines how particular information associated with a user can be shared. The authorization server may allow users to opt in to or opt out of having their actions logged by the social-networking system 560 or shared with other systems (e.g., a third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
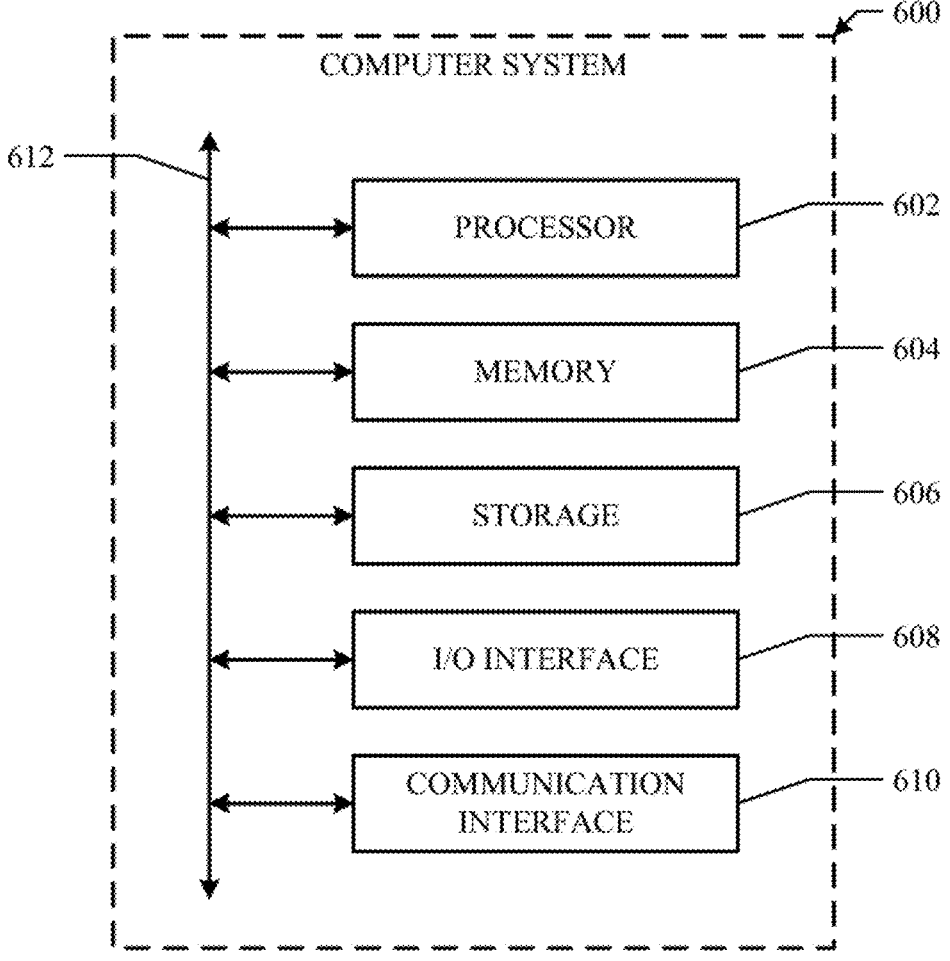
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computing system comprising:
a color camera;
two monochrome cameras respectively associated with two eyes of a user;
a structured light projector that projects an infrared (IR) pattern at a configured frequency, wherein the two monochrome cameras are synchronized with the structured light projector so that the two monochrome cameras capture IR monochrome images containing reflections of the projected IR pattern at the configured frequency;

one or more processors; and one or more computer-readable non-transitory storage media coupled to one or more of the processors and comprising instructions operable when executed by one or more of the processors to cause the computing system to;

generate two stereoscopic colorized images to be respectively displayed to the two eyes of the user, wherein each of the two stereoscopic colorized images is generated using (1) a mesh generated based at least in part on two stereoscopic grayscale images respectively captured by the two monochrome cameras, (2) luminance information from one of the two stereoscopic grayscale images that is associated with one of the two eyes of the user to which the stereoscopic colorized image is to be displayed, and (3) color information from a color input image captured by the color camera.

2. The computing system of claim 1, further comprising two displays, wherein the processors are further operable when executing instructions to:

present each of the two stereoscopic colorized images to a corresponding display among the two displays.

3. The computing system of claim 1, where rendering each vertex in the mesh for generating each of the two stereoscopic colorized images comprises:

identifying a first corresponding pixel in a corresponding grayscale image by performing a raycasting from the vertex into a corresponding monochrome camera that captures the corresponding grayscale image;

identifying a second corresponding pixel in the color input image by performing a raycasting from the vertex into the color camera;

converting first RGB values associated with the second corresponding pixel into second color information in a second color space, wherein a luminance level indicator is separated from one or more chrominance information indicators in the second color space;

replacing the luminance level indicator in the second color information with a value corresponding to a luminance level associated with the first corresponding pixel;

converting the second color information into second RGB values; and rendering the vertex with the second RGB values.

4. The computing system of claim 3, wherein the second color space is a CIELAB color space.

5. The computing system of claim 1, wherein the processors are further operable when executing instructions to:

subsample points in a point cloud to reduce a number of points in the point cloud, wherein a first sampling rate corresponding to a first area may be higher than a second sampling rate corresponding to a second area when the first area has higher gradients than the second area in the two stereoscopic grayscale images, wherein the mesh is generated based on the point cloud.

6. The computing system of claim 1, wherein the processors are further operable when executing instructions to:

filter a point in a point cloud with an estimated likelihood of being a non-noise point is lower than a threshold likelihood associated with a location of the point, wherein the mesh is generated based on the point cloud.

7. The computing system of claim 6, wherein a first threshold likelihood associated with a first location of the point cloud is lower than a second threshold likelihood associated with a second location when the first location is within a first threshold distance from the two monochrome cameras and the second location is beyond the first threshold distance from the two monochrome cameras.

8. The computing system of claim 6, wherein the estimated likelihood for the point of being a non-noise point is estimated based on a number of consecutive observations of the point in a predetermined number of preceding frames, and wherein the threshold likelihood associated with the location is represented by a minimum number of consecutive observations of the point in the predetermined number of preceding frames.

9. The computing system of claim 1, further comprising generating the mesh at least in part by:

initializing the mesh corresponding to a point cloud as a flat mesh at a pre-determined distance from the two monochrome cameras;

for each point in the point cloud:

identifying a vertex of the mesh corresponding to the point;

warp the identified vertex to a location of the point in the point cloud;

determining that the point in the point cloud is within a second threshold distance; and warp, in response to the determination that the point in the point cloud is within the second threshold distance, k vertices nearest to the identified vertex to the location of the point, wherein k is a pre-determined positive integer.

10. The computing system of claim 1, wherein each of the two monochrome cameras captures j non-IR monochrome images containing no projected IR pattern reflection between two consecutive IR image captures, and wherein j is a pre-configured positive integer.

11. The computing system of claim 10, further comprising computing a point cloud based on the reflections of the projected IR pattern in the IR monochrome images captured by the two monochrome cameras, wherein the mesh is generated based on the computed point cloud.

12. A method comprising, by a computing system comprising a color camera, a structured light projector that projects an infrared (IR) pattern at a configured frequency, and two monochrome cameras respectively associated with two eyes of a user:

receiving a color input image captured by the color camera;

receiving two stereoscopic grayscale images respectively captured by the two monochrome cameras, wherein the two monochrome cameras are synchronized with the structured light projector so that the two monochrome cameras capture IR monochrome images containing reflections of the projected IR pattern at the configured frequency; and generating two stereoscopic colorized images to be respectively displayed to the two eyes of the user, wherein each of the two stereoscopic colorized images is generated using (1) a mesh generated based at least in part on the two stereoscopic grayscale images respectively captured by the two monochrome cameras, (2) luminance information from one of the two stereoscopic grayscale images that is associated with one of the two eyes of the user to which the stereoscopic colorized image is to be displayed, and (3) color information from a color input image captured by the color camera.

13. The method of claim 12, wherein the computing system further comprises two displays, the method further comprising:

presenting each of the two stereoscopic colorized images to a corresponding display among the two displays.

14. The method of claim 12, where rendering each vertex in the mesh for generating each of the two stereoscopic colorized images comprises:

identifying a first corresponding pixel in a corresponding grayscale image by performing a raycasting from the vertex into a corresponding monochrome camera that captures the corresponding grayscale image;

identifying a second corresponding pixel in the color input image by performing a raycasting from the vertex into the color camera;

converting first RGB values associated with the second corresponding pixel into second color information in a second color space, wherein a luminance level indicator is separated from one or more chrominance information indicators in the second color space;

replacing the luminance level indicator in the second color information with a value corresponding to a luminance level associated with the first corresponding pixel;

converting the second color information into second RGB values; and rendering the vertex with the second RGB values.

15. The method of claim 14, wherein the second color space is a CIELAB color space.

16. The method of claim 12, further comprising:

subsampling points in a point cloud to reduce a number of points in the point cloud, wherein a first sampling rate corresponding to a first area may be higher than a second sampling rate corresponding to a second area when the first area has higher gradients than the second area in the two stereoscopic grayscale images, wherein the mesh is generated based on the point cloud.

17. The method of claim 12, further comprising:

filtering a point in a point cloud with an estimated likelihood of being a non-noise point is lower than a threshold likelihood associated with a location of the point, wherein the mesh is generated based on the point cloud.

18. The method of claim 17, wherein a first threshold likelihood associated with a first location of the point cloud is lower than a second threshold likelihood associated with a second location when the first location is within a first threshold distance from the two monochrome cameras and the second location is beyond the first threshold distance from the two monochrome cameras.

19. The method of claim 17, wherein the estimated likelihood for the point of being a non-noise point is estimated based on a number of consecutive observations of the point in a predetermined number of preceding frames, and wherein the threshold likelihood associated with the location is represented by a minimum number of consecutive observations of the point in the predetermined number of preceding frames.

20. One or more computer-readable non-transitory storage media embodying software that is operable when executed to, by a computing system comprising a color camera, a structured light projector that projects an infrared (IR) pattern at a configured frequency, and two monochrome cameras respectively associated with two eyes of a user:

receive a color input image captured by the color camera;

receive two stereoscopic grayscale images respectively captured by the two monochrome cameras, wherein the two monochrome cameras are synchronized with the structured light projector so that the two monochrome cameras capture IR monochrome images containing reflections of the projected IR pattern at the configured frequency; and generate two stereoscopic colorized images to be respectively displayed to the two eyes of the user, wherein each of the two stereoscopic colorized images is generated using (1) a mesh generated based at least in part on the two stereoscopic grayscale images respectively captured by the two monochrome cameras, (2) luminance information from one of the two stereoscopic grayscale images that is associated with one of the two eyes of the user to which the stereoscopic colorized image is to be displayed, and (3) color information from a color input image captured by the color camera.

* * * * *